United States Patent
Leblanc

(10) Patent No.: US 8,457,867 B2
(45) Date of Patent: Jun. 4, 2013

(54) METHOD FOR OPERATING A VEHICLE

(75) Inventor: Jean-Yves Leblanc, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 382 days.

(21) Appl. No.: 12/670,567

(22) PCT Filed: Jun. 30, 2008

(86) PCT No.: PCT/US2008/068713
§ 371 (c)(1),
(2), (4) Date: Jan. 25, 2010

(87) PCT Pub. No.: WO2009/014861
PCT Pub. Date: Jan. 29, 2009

(65) Prior Publication Data
US 2010/0222992 A1     Sep. 2, 2010

Related U.S. Application Data

(60) Provisional application No. 60/952,074, filed on Jul. 26, 2007.

(51) Int. Cl.
*G06F 19/00* (2006.01)
*G06G 7/70* (2006.01)
*B60Q 1/00* (2006.01)

(52) U.S. Cl.
USPC ............................ 701/113; 340/438; 340/457

(58) Field of Classification Search
USPC ..... 701/113, 114, 115; 123/179.3; 340/425.5, 340/438, 457, 984
See application file for complete search history.

(56) References Cited

U.S. PATENT DOCUMENTS

| | | | | |
|---|---|---|---|---|
| 4,389,541 A * | 6/1983 | Nakano et al. | ................ | 704/274 |
| 5,602,426 A * | 2/1997 | Ecker | ............................ | 307/10.2 |
| 6,396,394 B1 * | 5/2002 | Suzuki et al. | .............. | 340/425.5 |
| 6,674,360 B2 * | 1/2004 | Nakamura et al. | ............ | 340/435 |
| 6,766,231 B2 * | 7/2004 | Nakagawa et al. | .......... | 701/29.4 |
| 2009/0179745 A1* | 7/2009 | Okamoto et al. | .......... | 340/425.5 |

FOREIGN PATENT DOCUMENTS

| | | |
|---|---|---|
| CA | 2531265 A1 | 6/2007 |
| EP | 0392411 A | 10/1990 |
| GB | 2209050 A | 4/1989 |
| GB | 2273580 A | 6/1994 |
| WO | 2003058359 A | 7/2003 |

OTHER PUBLICATIONS

International Search Report of PCT/US2008/068713; Dec. 10, 2008; Frits Van der Veen.

* cited by examiner

*Primary Examiner* — Stephen K Cronin
*Assistant Examiner* — Sherman Manley
(74) *Attorney, Agent, or Firm* — BCF LLP

(57) ABSTRACT

A vehicle is disclosed, including a startup switch electrically connected to the ECU. Actuation of the startup switch causes a signal to be sent to the ECU indicative of a desired operation of the vehicle. A display device is disposed forwardly of the seat for displaying information to the rider. Actuation of a confirmation switch causes a confirmation signal to be sent to the ECU indicative of a display of information to a rider. Upon actuation of the startup switch, the ECU prevents the vehicle from moving until information is displayed by the display device and the confirmation signal is received by the ECU. A method of operating a vehicle is also disclosed.

23 Claims, 9 Drawing Sheets

METHOD FOR OPERATING A VEHICLE

CROSS REFERENCE

The present application claims priority to U.S. Provisional Patent Application No. 60/952,074 filed on Jul. 26, 2007, entitled "Method of Operating a Vehicle", the entirety of which is incorporated herein by reference.

FIELD OF THE INVENTION

The present invention relates to a method of operating a vehicle.

BACKGROUND OF THE INVENTION

When a vehicle of any type is purchased, an owner's manual is typically provided therewith, with the intention that the owner's manual be read by the rider prior to using the vehicle. The owner's manual contains information regarding the proper operation of the vehicle, which may include warnings or other safety information. The owner's manual is typically stored with the vehicle, so that the rider can make reference to it at any time, as needed.

In addition, some vehicles are provided with stickers placed on the vehicle, on which warning messages or other information may be written. These stickers are generally placed where they are easily seen by the rider, such as in areas where the rider will see the message during operation of the vehicle, or near the area where the information has particular relevance.

These warning stickers are generally not very aesthetically pleasing, since they may require a substantial amount of space, and they are designed to be readily visible. On vehicles such as snowmobiles, personal watercraft, all-terrain vehicles (ATVs), motorcycles and three-wheeled motorized vehicles, there is not much exposed surface to begin with, and these warnings may occupy a significant proportion of the exposed surface, making them particularly unsightly.

In both of these instances, there is no guarantee that the information will be read by the rider before operating the vehicle.

Therefore, there is a need for a way of ensuring that certain information intended for a rider is read by the rider, without detracting from the aesthetic appeal of the vehicle.

SUMMARY OF THE INVENTION

It is an object of the present invention to ameliorate at least some of the inconveniences present in the prior art.

It is also an object of the present invention to provide a vehicle wherein when the ignition switch is activated, a message is displayed to the rider. The rider must read the message and activate a confirmation switch indicating that he has read the message, before the vehicle is permitted to start.

In one aspect, the invention provides a vehicle comprising a frame, a vehicle body disposed on the frame and a power pack supported at least in part by the frame for powering the vehicle. The power pack includes an engine. An electronic control unit (ECU) is electrically connected to the power pack. At least one seat is supported by the frame for receiving a rider thereon. A steering assembly is disposed at least in part forwardly of the seat for steering the vehicle. A startup switch is electrically connected to the ECU. Actuation of the startup switch causes a signal to be sent to the ECU indicative of a desired operation of the vehicle. A display device is disposed forwardly of the seat for displaying information to the rider. The display device is electrically connected to the ECU. A confirmation switch is electrically connected to the ECU. Actuation of the confirmation switch causes a confirmation signal to be sent to the ECU indicative of a display of information to a rider. Upon actuation of the startup switch, the ECU prevents the vehicle from moving until information is displayed by the display device and the confirmation signal is received by the ECU.

In a further aspect, preventing the vehicle from moving comprises preventing engine startup.

In a further aspect, the power pack comprises at least one fuel injector for supplying fuel to the engine. Preventing the vehicle from moving comprises preventing current flow to the at least one fuel injector.

In a further aspect, the power pack comprises a starter electrically connected to the ECU. Preventing engine startup comprises preventing current flow to the starter.

In a further aspect, the engine comprises at least one spark plug. The at least one spark plug is electrically connected to the ECU. Preventing engine startup comprises preventing current flow to the at least one spark plug.

In a further aspect, the power pack further comprises a fuel pump electrically connected to the ECU for supplying fuel to the engine. Preventing engine startup comprises preventing current flow to the fuel pump.

In a further aspect, the vehicle further comprises at least one propulsion device selectively operatively connected to the engine for moving the vehicle. Preventing the vehicle from moving comprises operatively decoupling the engine from the propulsion device.

In a further aspect, the vehicle further comprises a propulsion device operatively connected to the engine for moving the vehicle and a brake operatively connected to the propulsion device. Preventing the vehicle from moving comprises applying the brake to the propulsion device.

In a further aspect, the startup switch and the confirmation switch are a single switch.

In a further aspect, the confirmation switch is disposed on the steering assembly.

In a further aspect, the vehicle is one of a three-wheeled motorized vehicle, an all-terrain vehicle, a snowmobile, and a personal watercraft.

In a further aspect, the startup switch is part of one of a key-operated ignition system and a keyless ignition system.

In an additional aspect, the invention provides a method of operating a vehicle. The vehicle comprises a frame. At least one seat is supported by the frame for receiving a rider thereon. A power pack is supported by the frame for powering the vehicle. The power pack includes an engine. An ECU is electrically connected to the power pack. A display device is disposed forwardly of the seat for displaying information to the rider. The method comprises transmitting to the ECU a first signal indicative of a desired operation of the vehicle, displaying information to the rider via the display device, transmitting to the ECU a second signal confirming that the information has been displayed to the rider, and preventing the vehicle from moving until the receipt by the ECU of the second signal.

In a further aspect, transmitting to the ECU a signal indicative of a desired operation of the vehicle comprises actuating a startup switch.

In a further aspect, preventing the vehicle from moving comprises preventing engine startup.

In a further aspect, preventing engine startup comprises preventing current flow to a fuel injector of the engine.

In a further aspect, preventing engine startup comprises preventing current flow to a starter of the engine.

In a further aspect, preventing engine startup comprises preventing current flow to at least one spark plug of the engine.

In a further aspect, preventing engine startup comprises preventing current flow to a fuel pump. The fuel pump is operatively connected to the engine to supply fuel to the engine.

In a further aspect, preventing the vehicle from moving comprises operatively decoupling the engine from a propulsion device of the vehicle. The propulsion device is selectively operatively connected to the engine for moving the vehicle.

In a further aspect, preventing the vehicle from moving comprises applying a brake to a propulsion device of the vehicle. The propulsion device is operatively connected to the engine for moving the vehicle.

In a further aspect, the information is at least one message. The at least one message is displayed by the display device in response to the actuation of the startup switch.

In a further aspect, the at least one message is a warning message.

In a further aspect, the at least one message is a plurality of messages including at least one first message and a second message. Displaying information to the rider via the display device comprises a) displaying the at least one first message to the rider via the display device, b) transmitting to the ECU a third signal confirming that the at least one first message has been displayed to the rider, and c) displaying the second message to the rider via the display device. Transmitting to the ECU a second signal confirms that the second message has been displayed to the rider.

In a further aspect, the at least one first message is a plurality of first messages to be displayed in a sequence. The method further comprises repeating a) and b) sequentially for each of the plurality of first messages, until all of the plurality of first messages have been displayed to the rider. The displaying of the second message to the rider occurs once all of the plurality of first messages have been displayed.

In an additional aspect, the invention provides a method of operating a vehicle. The vehicle comprises a frame. At least one seat is supported by the frame for receiving a rider thereon. A power pack is supported by the frame for powering the vehicle. The power pack includes an engine. An ECU is electrically connected to the power pack. A display device is disposed forwardly of the seat for displaying information to the rider. The information has a plurality of parts. The method comprises: transmitting to the ECU a first signal indicative of a desired operation of the vehicle; sequentially displaying the parts of the information to the rider via the display device until at least one of: a) receipt by the ECU of a second signal initiated by the rider in response to at least one of the parts of the information being displayed; and b) the sequential display of all of the plurality of parts of the information to the rider; and preventing the vehicle from moving during the sequential displaying of the parts of the information.

In a further aspect, the method comprises sequentially displaying the parts of the information to the rider via the display device until: a) receipt by the ECU of a second signal initiated by the rider in response to the at least one part of the information being displayed; and b) the sequential display of all of the plurality of parts of the information to the rider.

For the purposes of this application, the term "message" means one or more lines of text to be displayed. The term "information" may include one or more messages and may include one or more other forms of visual communication such as icons or diagrams.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

A method of operating a vehicle in accordance with embodiments of the present invention will be described with respect to its use with snowmobiles, personal watercraft, ATVs and three-wheeled motorized vehicles. However, it should be understood that the present invention could also be applied to other types of vehicles, such as motorcycles.

There will now be described a snowmobile 10 to which the method of the present invention can be applied.

Figure 1:
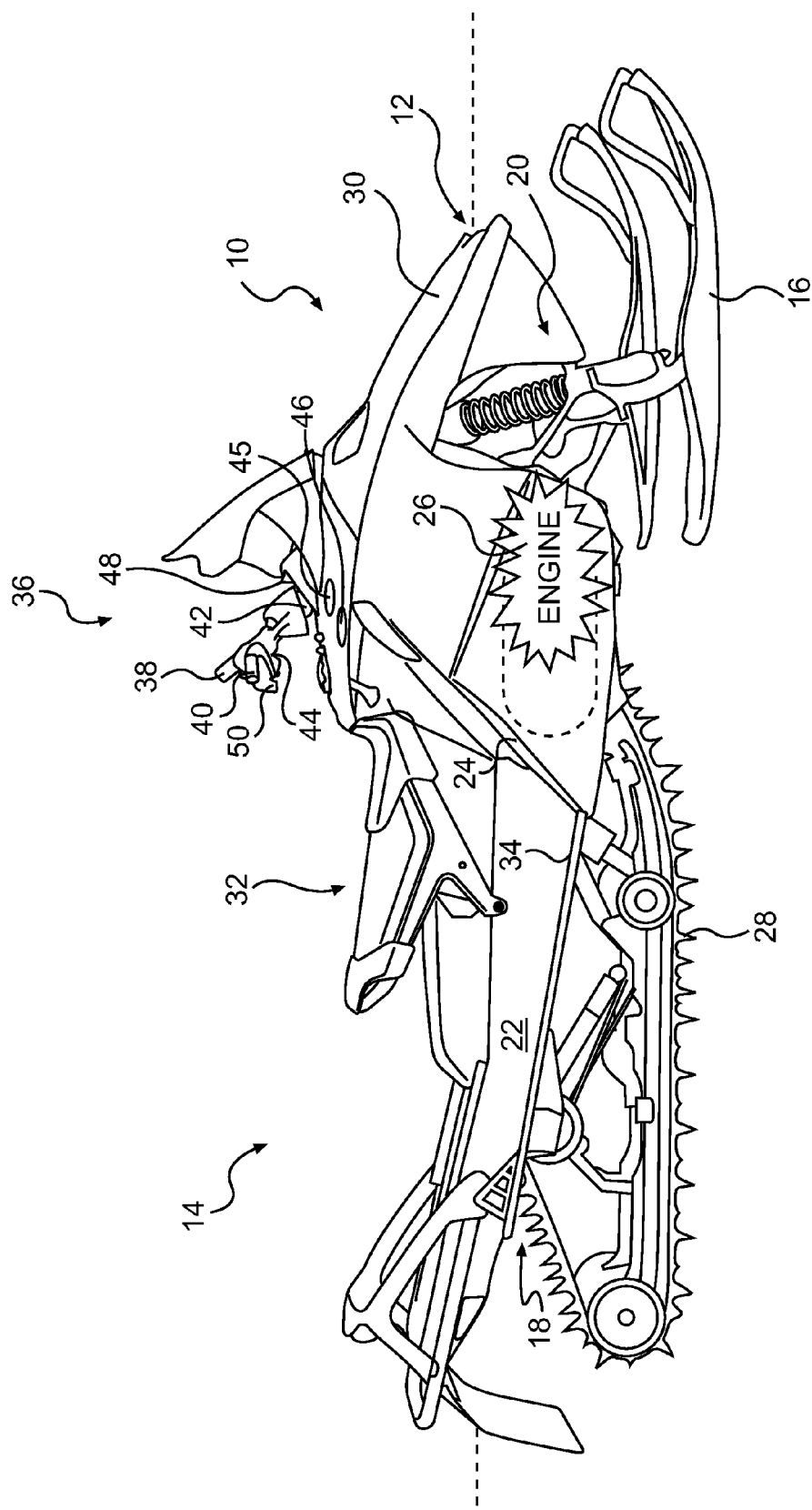
FIG. 1 is a side elevation view of a snowmobile.

FIG. 1 shows a side elevation view of the snowmobile 10 having a forward end 12 and a rearward end 14. The snowmobile 10 has two laterally spaced skis 16, each mounted on the frame 18 via a suspension 20 in a known manner. The frame includes a tunnel portion 22 and an engine compartment 24 forward of the tunnel portion 22. The tunnel portion 22 generally includes one or more pieces of sheet metal bent into an inverted U-shape. The snowmobile 10 also has an engine 26 (schematically illustrated in FIG. 1) carried by the engine compartment 24. The engine 26, via a transmission (not shown), powers a rear track 28 disposed within the tunnel portion 22 to propel the vehicle. The operation of the engine 26 is controlled by an ECU, the operation of which will be described in further detail below. The vehicle frame 18 supports a body composed of a number of fairings 30 which provide aesthetic appeal and protect the rider from dirt and snow that may be lifted by the track 28 while the snowmobile 10 is in use.

A straddle seat 32 mounted on the frame provides a seating position for a rider. The snowmobile 10 may alternatively have additional seating positions for one or two passengers. A pair of footrests 34 are provided below the seat 32 for the rider to rest his feet thereon.

A steering assembly 36 is provided generally forward of the seat 32. The steering assembly 36 has a left handlebar 38 and a right handlebar 40 that can be gripped by the rider. The handlebars 38, 40 are connected to a steering column 42. The steering column 42 is connected to the front skis 16 in a known manner, such that turning the handlebars 38, 40 turns the skis 16 to steer the snowmobile 10. A brake actuator, in the form of a hand brake lever 44, is provided near the right handlebar 40 for braking the snowmobile 10 in a known manner.

The snowmobile 10 is equipped with a startup system including a post 45 designed to receive a key attached to a lanyard. When the rider plugs the key into the post 45, the startup system identifies the rider as an authorized rider of the snowmobile 10 by recognizing a code stored on a chip contained in the key, and the ECU is activated. Thereafter, the rider may press a startup switch in the form of a button 46 to send a signal to the ECU indicative of his desire to start the engine 26 of the snowmobile 10. It is contemplated that instead of pushing a button 46 the rider may pull a cord to indicate to the ECU his desire to start the engine 26. It is further contemplated that the snowmobile 10 may alternatively be equipped with other types of startup system, such as those described herein with respect to the other types of vehicle.

A display cluster 48 is provided forward of the seat 32. The display cluster 48 will be discussed in further detail below.

A confirmation switch 50 is provided on the steering assembly 36. It is contemplated that the confirmation switch 50 may be provided in any other suitable location, such as on or next to the display cluster 48, on the body forward of the seat 32, or in any other location readily accessible to the rider. Alternatively, the startup button 46 may also function as the confirmation switch, and a separate confirmation switch 50 would not be provided, thereby reducing the number of components required for the snowmobile 10. The operation of the confirmation switch 50 will be discussed in further detail below.

There will now be described a personal watercraft 100 to which the method of the present invention can be applied.

Figure 2:
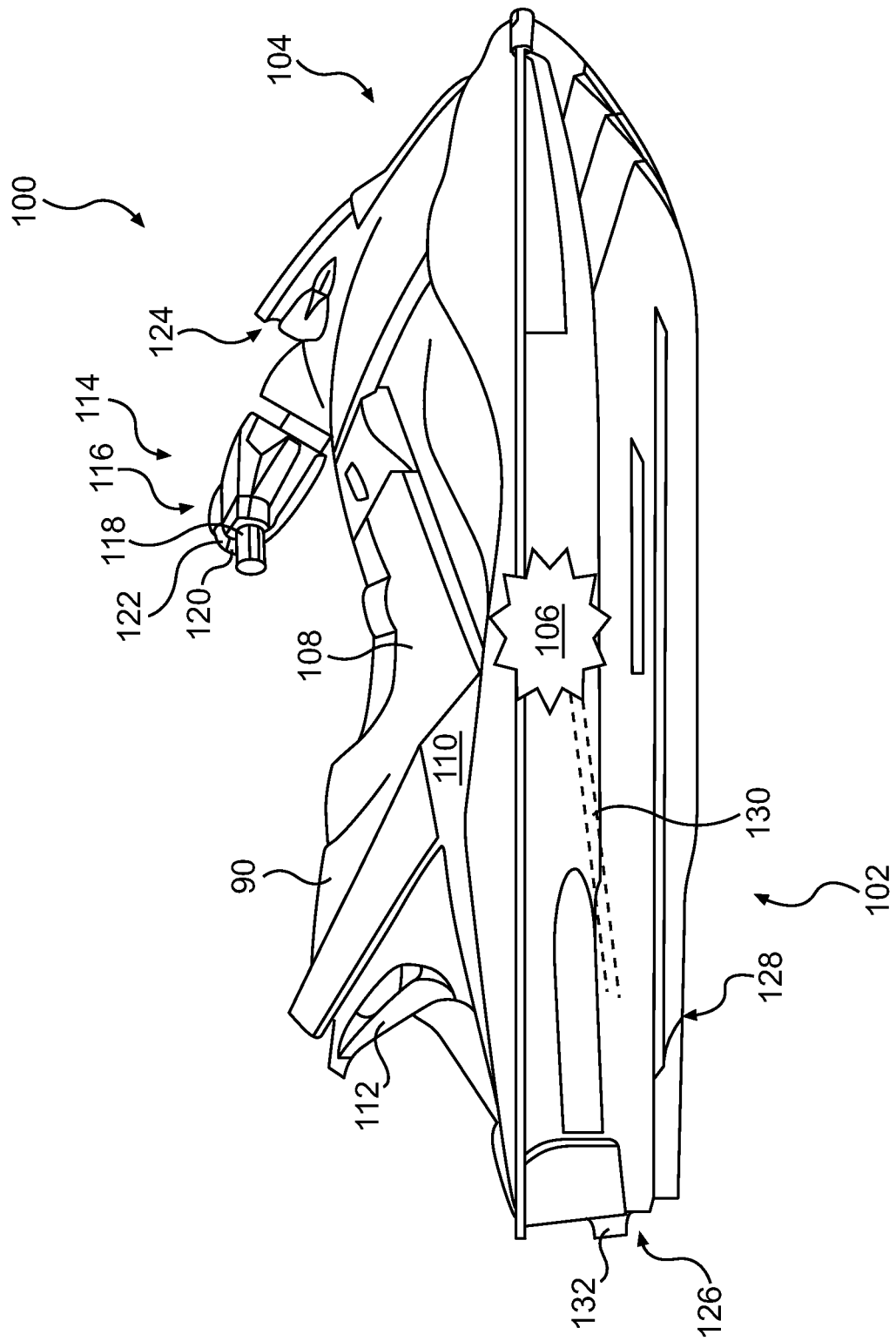
FIG. 2 is a side elevation view of a personal watercraft.

FIG. 2 is a side elevation view of the personal watercraft 100. The personal watercraft 100 has a vehicle body made of a hull 102 and a deck 104. The hull 102 buoyantly supports the watercraft 100 in the water, and the deck 104 is designed to accommodate a rider and, in some watercraft, one or more passengers. The volume created between the hull 102 and the deck 104 is known as the engine compartment (not shown). The engine compartment accommodates the engine 106 (schematically illustrated in FIG. 2) as well as the exhaust system, gas tank, electrical system (battery, ECU . . . ), air box, storage bins (not shown) and other elements required or desired for the watercraft 100. The function of the ECU will be described in further detail below.

The deck has mounted thereon a straddle seat 108 placed on top of a pedestal 110 to accommodate a rider in a straddling position. A grab handle 112 is provided between the pedestal 110 and the seat 108 at the rear of the seat 108 to be gripped by a passenger.

A handlebar assembly 114 is positioned generally forward of the seat 108. The handlebar assembly 114 has a central handlebar portion 116, that may be padded, and a pair of handlebars 118. One of the handlebars 118 is provided with a throttle operator in the form of a thumb-actuated throttle lever 120. Other types of throttle operators, such as a finger-actuated throttle lever and a twist grip, are also contemplated. The other steering handle 118 is provided with a confirmation switch 122. It is contemplated that the confirmation switch may instead be located in any other convenient location within reach of the rider, such as on or next to the display cluster 124, or on the body forward of the seat 108. The function of the confirmation switch 122 will be discussed in further detail below.

A display cluster 124 is located forwardly of the handlebar assembly 114 for displaying information to the rider as will be discussed in further detail below.

The watercraft 100 is equipped with a startup system including a key receiving post (not shown), preferably located near a center of the central handlebar portion 116, designed to receive a key attached to a lanyard. When the rider plugs the key into the post, the startup system identifies the rider as an authorized rider of the watercraft 100 by recognizing a code stored on a chip contained in the key, and the ECU is activated. Thereafter, the rider may press a startup switch in the form of a startup button (not shown) to send a signal to the ECU indicative of his desire to start the engine 106 of the watercraft 100. It should be noted that the key receiving post and the startup button may be placed in any suitable location on the watercraft 100. It is contemplated that the watercraft 100 may alternatively be equipped with other types of startup system, such as those described herein with respect to the other types of vehicle.

The watercraft 100 is propelled by a jet propulsion system 126 including a jet pump (not shown). It is contemplated that other types of propulsion system, such as propellers, could be used. The jet propulsion system 126 pressurizes water and accelerates it to create thrust. The water is first scooped from under the hull 102 through an inlet grate 128. The inlet grate 128 prevents large rocks, weeds, and other debris from entering the jet propulsion system 126 since they may damage it or negatively affect its performance. Water then flows through the water intake ramp (not shown). From the intake ramp, water then enters the jet pump. The jet pump is made of two main parts: the impeller (not shown) and the stator (not shown). The impeller is coupled to the engine 106 by one or more shafts 130, such as a driveshaft and an impeller shaft. The rotation of the impeller pressurizes the water, which then moves over the stator that is made of a plurality of fixed stator blades (not shown). The role of the stator blades is to decrease the rotational motion of the water so that almost all the energy given to the water is used for thrust, as opposed to swirling the water. Once the water leaves the jet pump, it goes through the venturi (not shown). Since the venturi's exit diameter is smaller than its entrance diameter, the water is accelerated further, thereby providing more thrust. A steering nozzle 132 is pivotally attached to the venturi through a vertical pivot point. The steering nozzle 132 is operatively connected to the handlebar assembly 114 via a push-pull cable (not shown) such that when the handlebar assembly 114 is turned, the steering nozzle 132 pivots, redirects the water coming from the venturi, so as to steer the watercraft 100 in the desired direction.

There will now be described an ATV 200 to which the method of the present invention can be applied.

Figure 3:
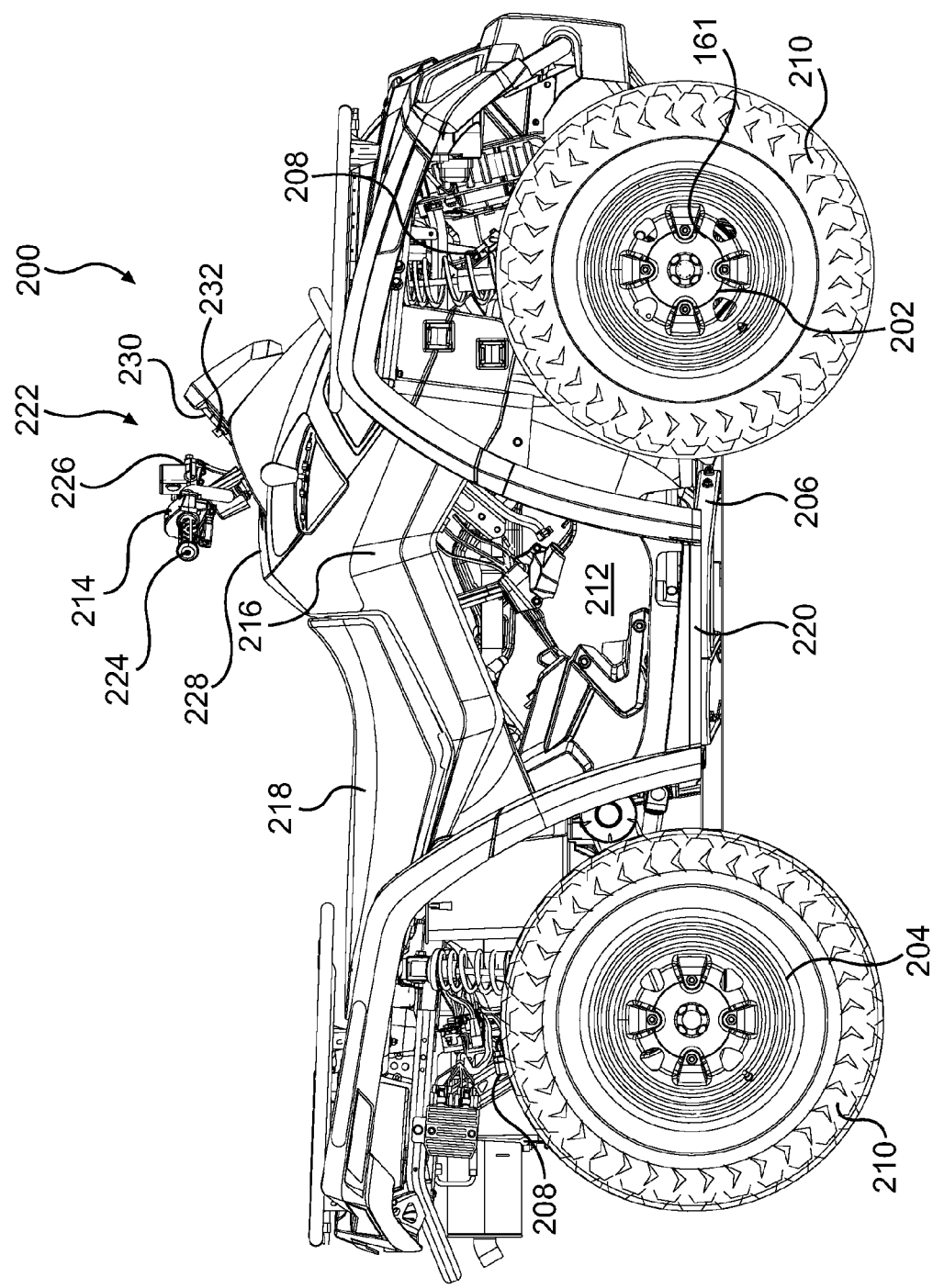
FIG. 3 is a side elevation view of an ATV.

FIG. 3 is a side elevation view of the ATV 200. The ATV 200 has two laterally spaced front wheels 202 and two laterally spaced rear wheels 204, each mounted on the frame 206 via a suspension 208 in a known manner. Each of the front wheels 202 and the rear wheels 204 has mounted thereon a low-pressure balloon tire. The front wheels are each provided with a brake (not shown) for braking the ATV in a known manner. The rear wheels 204 are powered by an engine 212

(schematically illustrated in FIG. 3) via a transmission (not shown) to propel the vehicle. The operation of the engine 212 is controlled by an ECU, the operation of which will be described in further detail below. The frame 206 supports a body composed of a number of fairings 216 which provide aesthetic appeal and protect the rider from dirt and water that may be lifted by the tires while the vehicle is in use.

A straddle seat 218 mounted on the frame 206 provides a seating position for a rider. The ATV 200 may also have a second seating position for a passenger. A pair of footrests 220 is provided below the seat 218 for the rider to rest his feet thereon.

A steering assembly 222 is provided generally forward of the seat 218. The steering assembly has a pair of handlebars 224 that can be gripped by a rider. The handlebars 224 are connected to a steering column 226. The steering assembly 222 is connected to the front wheels 202 in a known manner, such that turning the handlebars 224 turns the front wheels 202 to steer the ATV 200.

The ATV 200 is provided with a startup system including a key receiving cylinder 228 for receiving a startup key. When the appropriate key is inserted in the key receiving cylinder, the key can be turned inside the cylinder to a first position, at which point the ECU is activated. Thereafter, the rider may turn the key to a second position to send a signal to the ECU indicative of his desire to start the engine 212 of the ATV 200. The ATV 200 may alternatively be equipped with a keyless startup system including a receiver (not shown) for receiving a signal from a small, portable transmitter carried by the rider to activate the ECU. The transmitter transmits a code that is recognized by the startup system to identify the rider as an authorized rider of the vehicle, and activates the ECU. Thereafter, the rider may press a startup button (not shown) to send a signal to the ECU indicative of his desire to start the engine 212 of the ATV 200. It is contemplated that the ATV 200 may alternatively be equipped with other types of startup system, such as those described herein with respect to the other types of vehicle.

A display cluster 230 is provided forward of the seat 218. The display cluster 230 will be discussed in further detail below.

A confirmation switch 232 is provided next to the display cluster 230. It is contemplated that the confirmation switch 232 may be provided in any other suitable location, such as on either handlebar 224, on the steering column 226, on the body forward of the seat 218, or in any other location readily accessible to the rider. The operation of the confirmation switch 232 will be discussed in further detail below.

There will now be described a three-wheeled motorized vehicle 300 to which the method of the present invention can be applied.

Figure 4:
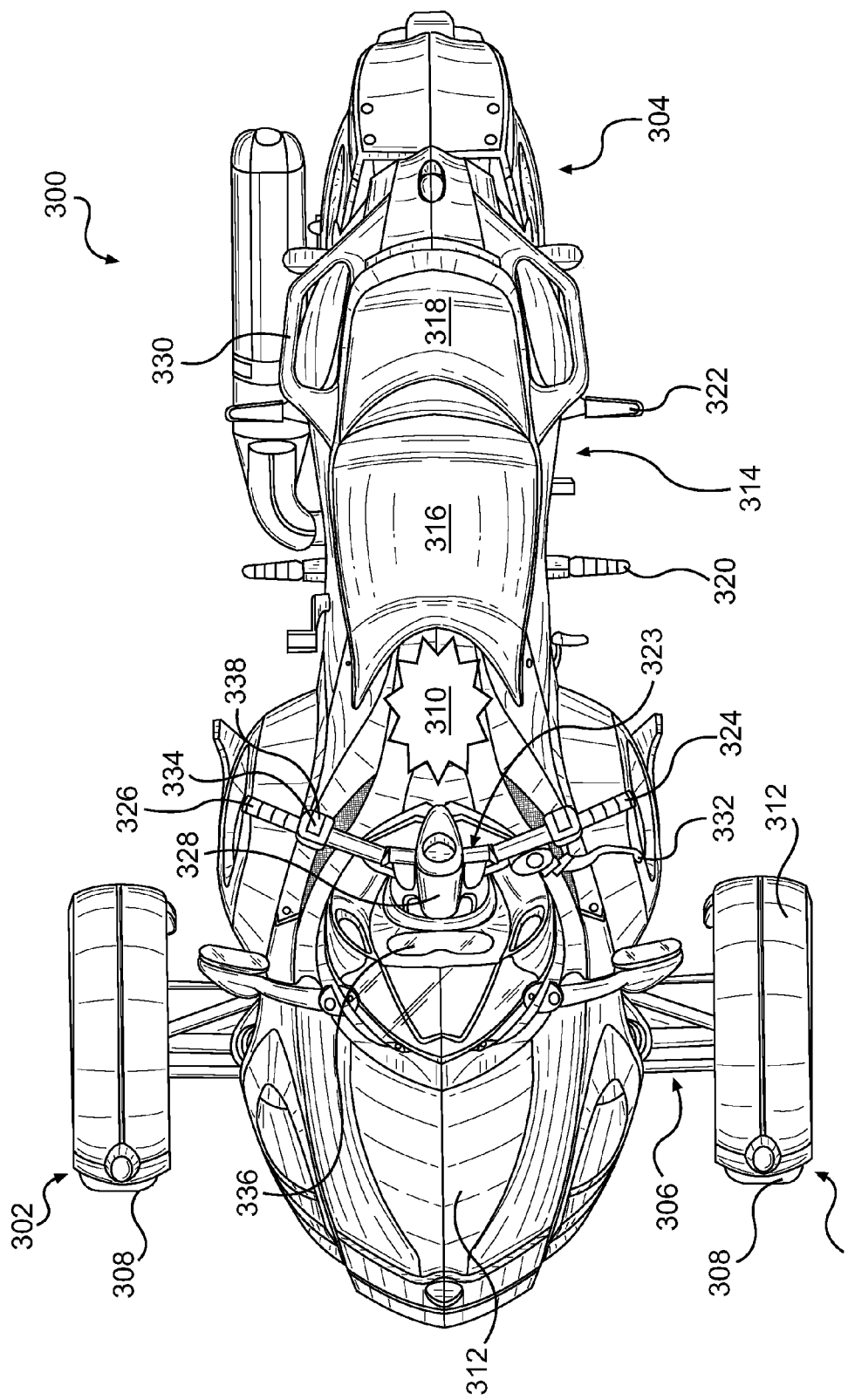
FIG. 4 is a top view of a three-wheeled motorized vehicle.

FIG. 4 is a top view of a three-wheeled motorized vehicle 300. The vehicle 300 has two laterally spaced front wheels 302 and a single rear wheel 304, each mounted on the frame (not shown) via a suspension 306 in a known manner. Each of the front wheels 302 and the rear wheel 304 has mounted thereon a tire 308 suitable for road use. It is contemplated that the rear wheel 304 may have two or more tires disposed next to each other mounted thereon and still be considered a single wheel. The front and rear wheels 302, 304 are each provided with a brake (not shown). The rear wheel 304 is powered by an engine 310 (schematically illustrated in FIG. 4) via a transmission (not shown) to propel the vehicle 300. The operation of the engine 310 is controlled by an ECU, the operation of which will be described in further detail below. The vehicle frame supports a body composed of a number of fairings 312 which provide aesthetic appeal and protect the rider from dirt and water that may be lifted by the tires while the vehicle is in use.

A straddle seat 314 mounted on the frame provides a first seating position 316 for a rider, and a second seating position 318 for a passenger. The vehicle 300 may alternatively have only a single seating position 316 for the rider. A pair of grab handles 330 is provided to be gripped by the passenger. A pair of rider foot pegs 320 and a pair of passenger foot pegs 322 are provided below the seat 314 for the rider and passenger, respectively, to rest their feet thereon.

A steering assembly 323 is provided generally forward of the seat 314. The steering assembly 323 has a left handlebar 324 and a right handlebar 326 that can be gripped by a rider. The handlebars 324, 326 are connected to a steering column 328. The steering assembly 323 is connected to the front wheels 302 in a known manner, such that turning the handlebars 324, 326 turns the wheels 302 to steer the vehicle. A brake actuator, in the form of a hand brake lever 332, is provided near the left handlebar 324 for braking the vehicle 300.

The vehicle 300 is provided with a startup system including a key receiving cylinder (not shown) for receiving a startup key. When the appropriate key is inserted in the key receiving cylinder, the key can be turned inside the cylinder to a first position, at which point the ECU is activated. Thereafter, the rider may turn the key to a second position to send a signal to the ECU indicative of his desire to start the engine 310 of the vehicle 300. The vehicle 300 may alternatively be equipped with a keyless startup system including a receiver (not shown) for receiving a signal from a small, portable transmitter carried by the rider to activate the ECU. The transmitter transmits a code that is recognized by the startup system to identify the rider as an authorized rider of the vehicle, and activates the ECU. Thereafter, the rider may press a startup button 334 to send a signal to the ECU indicative of his desire to start the engine 310 of the vehicle 300.

A display cluster 336 is provided forward of the seat 314, for displaying information to the rider. The display cluster 336 will be discussed in further detail below.

A confirmation switch 338 is provided in any suitable location within reach of the rider, such as on one of the handlebars 324, 326, on or next to the display cluster 336, on the steering column 328, on the fairings 312 forward of the seat 314, or in any other location readily accessible to the rider. The operation of the confirmation switch 338 will be discussed in further detail below.

The function of a display cluster 410 will now be described. It should be understood that the description of the display cluster 410 can apply to any one of the display cluster 48 of the snowmobile 10, the display cluster 124 of the watercraft 100, the display cluster 230 of the ATV 200, and the display cluster 336 of the three-wheeled motorized vehicle 300.

Figure 5:
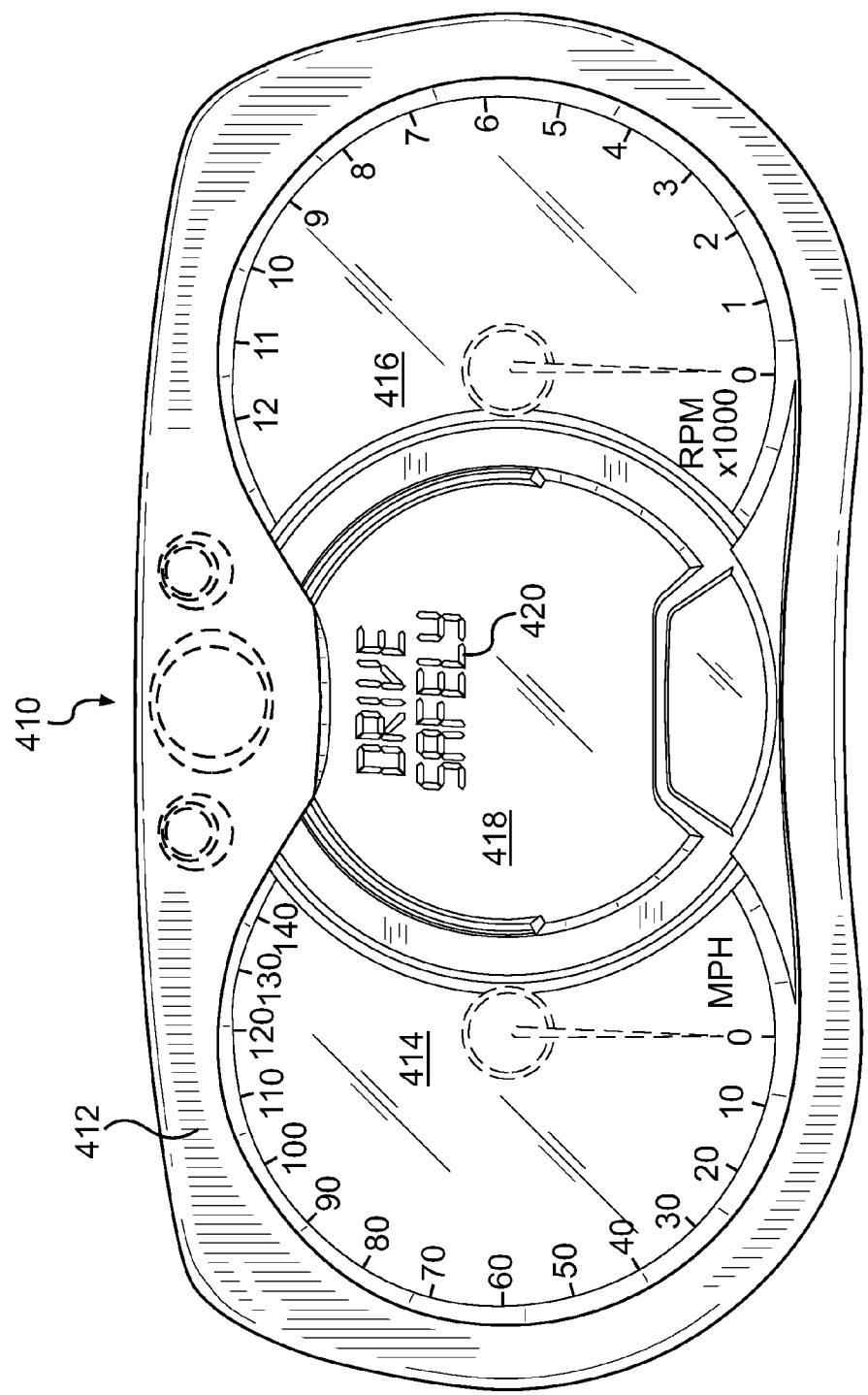
FIG. 5 is an elevation view of a vehicle display cluster according to an embodiment of the present invention.

FIG. 5 shows an elevation view of a display cluster 410 according to an embodiment of the present invention, incorporated into a vehicle dashboard 412. A speedometer 414 indicates the current speed of the vehicle and a tachometer 416 indicates the current speed of engine rotation. The display cluster 410 may also include other gauges or indicators. A central region of the dashboard 412 includes an LCD display 418 configured to digitally display information 420 which is viewable by the rider when seated on the vehicle, in response to signals received from the ECU. Incorporating the LCD display 418 into the vehicle dashboard 412 as part of a display cluster 410 results in a compact and aesthetically pleasing arrangement. However, it is contemplated that the LCD display 418 may alternatively be a separate unit disposed in any convenient location on the vehicle where it will be seen by the rider prior to operating the vehicle. It is further contemplated that any suitable type of display may be substituted for the LCD display without departing from the scope of the invention, such as an LED display, or a series of icons that may be selectively back-lit from behind the dashboard 412 to make individual icons visible to the rider.

An ECU 500 and the components connected thereto in accordance with an embodiment of the present invention will now be described.

In the following description of the ECU 500 and the components connected thereto, components that are common to more than one of the vehicles described above, for example the engine, have been renumbered for ease of understanding and to illustrate the general application of the present invention to more than one type of vehicle.

Figure 6:
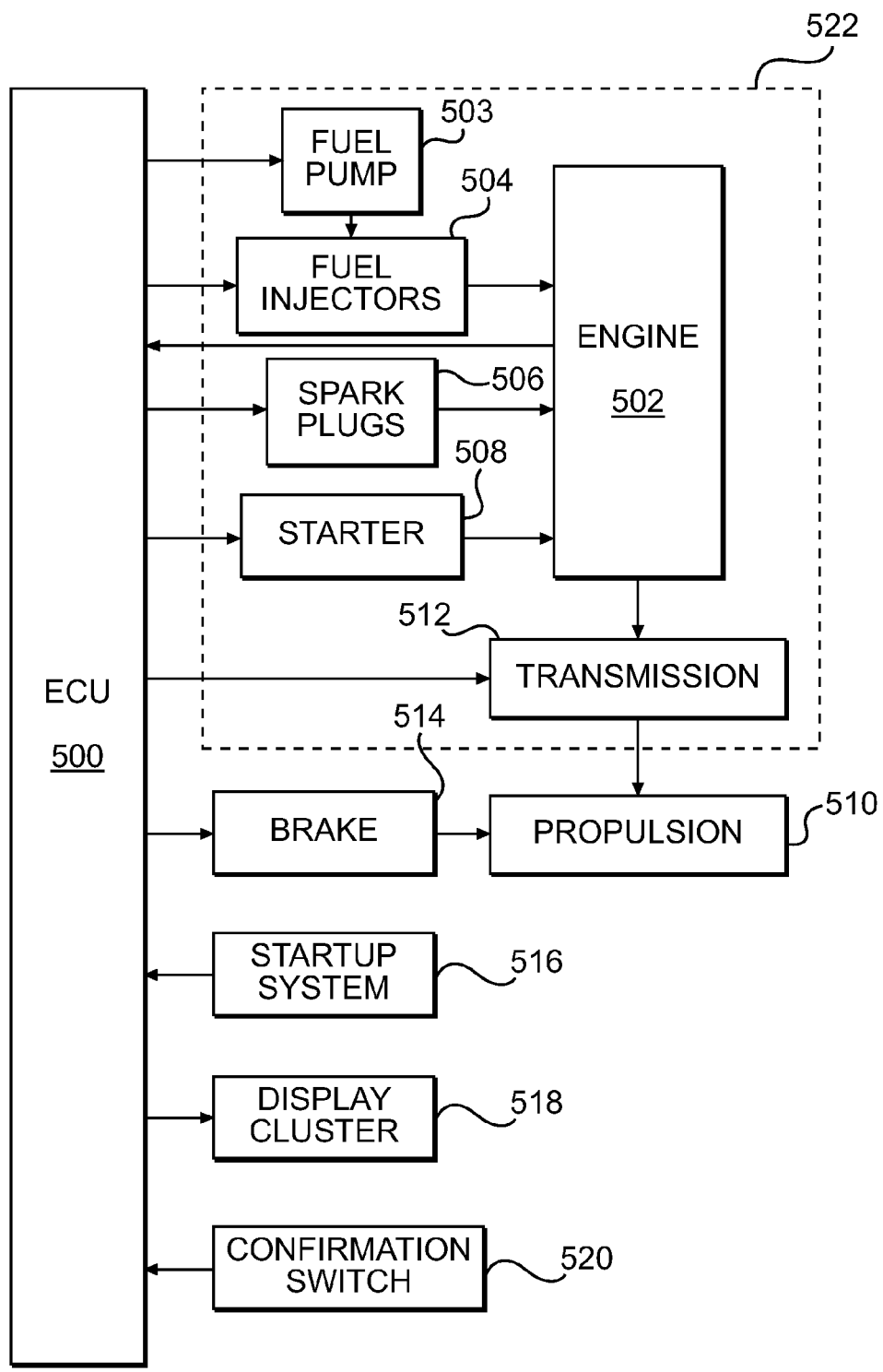
FIG. 6 is a schematic representation of an ECU and the components connected thereto, in accordance with an embodiment of the present invention.

As seen in FIG. 6, the ECU 500 is in communication with various parts of the vehicle, from which it may receive signals and to which it may send signals to control their operation. In the present embodiment, the ECU 500 is electrically connected to the engine 502 to receive information from various sensors (not shown) mounted on the engine 502. The ECU controls the operation of the engine 502 based on the information received. The ECU 500 is also electrically connected to one or more fuel pumps 503 and one or more fuel injectors 504 for controlling the fuel supply to the engine 502. The ECU 500 is also electrically connected to one or more spark plugs 506 for causing the combustion of fuel within the engine 502. The ECU 500 is also electrically connected to the starter 508 for starting the rotation of the engine 502. These components will be collectively referred to herein as the power pack 522, because they cooperate to power the vehicle. The ECU 500 is also electrically connected to a transmission 512 for controlling power transfer from the engine 502 to the propulsion unit 510, for example by engaging or disengaging the transmission 512 or by changing the gear ratio of the transmission 512. The ECU 500 is also electrically connected to a brake 514 for braking the propulsion unit 510. The ECU 500 is also electrically connected to the startup system 516 for receiving signals indicating that the rider is an authorized rider of the vehicle, and that the rider desires to operate the vehicle. The ECU 500 is also electrically connected to the display cluster 518 for sending signals to the display cluster 518 to display information to the rider. The ECU 500 is also electrically connected to the confirmation switch 520 for receiving signals confirming that information has been displayed to the rider via the display cluster 518. It is contemplated that the ECU 500 may only be electrically connected to some of these components and not to others. For example, the transmission 512 or the brake 514 could be manually operated by the rider by actuating a lever, and in this case no connection to the ECU 500 would be needed. It is also contemplated that a vehicle may not include all of these components. For example, the engine 502 might be supplied with fuel via a carburetor, in which case the vehicle would not include a fuel injector 504. If the vehicle is a personal watercraft, the propulsion unit 510 may be driven directly by the engine 502 via an intermediate shaft, in which case the vehicle would not include a transmission.

Figure 7A:
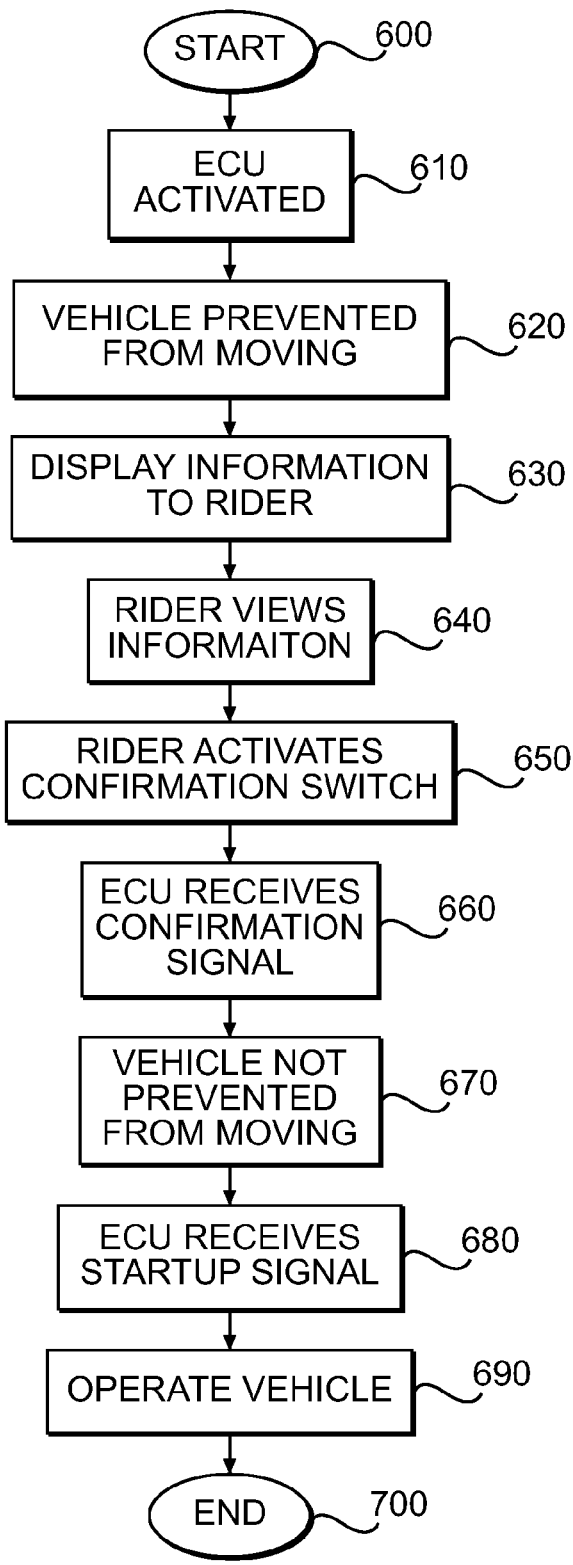
FIG. 7A is a logic diagram of the operation of a vehicle in accordance with a first embodiment of the present invention.

Referring now to FIG. 7A, the operation of a vehicle incorporating the present invention, starting at step 600, will be described in accordance with a first embodiment of the present invention.

At step 610, the ECU 500 is activated. The ECU 500 may be activated when the rider inserts a key into the key post of a key-operated startup system of the vehicle or turns the key at least partially in the key post. The ECU 500 may alternatively be activated when the keyless startup system of the vehicle receives a signal from a portable transmitter carried by the rider and identifies the rider as an authorized rider of the vehicle.

At step 620, the ECU 500 enters a first mode in which the vehicle is prevented from moving. The ECU 500 may prevent the vehicle from moving by preventing current flow to either the fuel pump 503 or the fuel injectors 504 to deprive the engine 500 of fuel, thereby preventing engine startup. The ECU 500 may alternatively prevent the vehicle from moving by preventing current flow to the spark plugs 506 to prevent fuel combustion in the engine 502, thereby preventing engine startup. The ECU 500 may alternatively prevent current flow to the starter 508 to prevent the rotation of the engine 502, thereby preventing engine startup. The ECU 500 may alternatively prevent the vehicle from moving by preventing the transmission 512 from transmitting power from the engine 502 to the propulsion unit 510. The ECU 500 may alternatively prevent the vehicle from moving by sending a signal to the brake 514 to brake the propulsion unit 510. It is further contemplated that the ECU 500 may use two or more of these methods concurrently to prevent the vehicle from moving. Other methods of preventing movement of the vehicle may be apparent to a person skilled in the art, and any of these other methods are considered to be within the scope of the present invention.

While the ECU 500 is in the first mode, the vehicle will not be responsive to attempts by the rider to cause the vehicle to move. For example, if the ECU 500 is preventing the vehicle from moving by preventing engine startup, the engine 502 will not start even if the rider presses the startup button, pulls the startup cord or turns the startup key. If the vehicle is provided with a single switch to perform the functions of both the startup switch and the confirmation switch, a signal received from this switch while the ECU 500 is in the first mode will be interpreted by the ECU 500 as a confirmation signal, as described below, and not as a startup signal.

At step 630, the ECU 500 sends a signal to the display cluster 410 to display information to the rider. The information may be a graphic symbol that will communicate to the rider important safety information such as the need to wear a helmet or other protective gear. The information may alternatively be text conveying a warning or safety message, or indicating that the rider consult the vehicle's owner's manual, which may contain warnings and/or safety messages, before operating the vehicle. Other forms of information are discussed in further detail below.

At step 640, the rider views the information displayed on the display cluster 410. It is contemplated that the information may be too large to be displayed in its entirety on the display cluster 410, in which case a first portion of the information will initially be displayed. Thereafter, the information may scroll automatically until the entire information has been displayed, or the rider may be provided with a way of causing the information to scroll or otherwise causing a subsequent portion of the information to be displayed, for example by activating the confirmation switch 520.

At step 650, the rider activates the confirmation switch 520, causing a confirmation signal to be sent to the ECU 500 to indicate to the ECU 500 that the rider has viewed the information displayed at step 630.

At step 660, the ECU 500 receives the confirmation signal.

At step 670, in response to the confirmation signal being received at step 660, the ECU 500 enters a second mode in which the vehicle is no longer prevented from moving. If the vehicle was prevented from moving at step 620 by preventing current flow to a component of the power pack 522 to prevent engine startup, the ECU 500 will now permit current to flow to that component of the power pack 522 when the rider attempts to start the engine 502. If the vehicle was prevented from moving at step 620 by preventing the transmission 512 from transmitting power from the engine 502 to the propulsion unit 510, the ECU 500 will now permit the transmission 512 to transmit power from the engine 502 to the propulsion unit 510 when the rider attempts to operate the vehicle. If the vehicle was prevented from moving at step 620 by applying a brake 514 to the propulsion unit 510, the ECU 500 will now send a signal to release the brake 514 and allow the propulsion unit 510 to propel the vehicle when the rider attempts to operate the vehicle. If the vehicle is provided with a single switch to perform the functions of both the startup switch and the confirmation switch, a signal received from this switch while the ECU 500 is in the second mode will be interpreted by the ECU 500 as a startup signal.

At step 680, the ECU receives a startup signal from the startup system 516 as previously described, thus allowing the rider to operate the vehicle at step 690.

The operation ends at step 700.

Figure 7B:
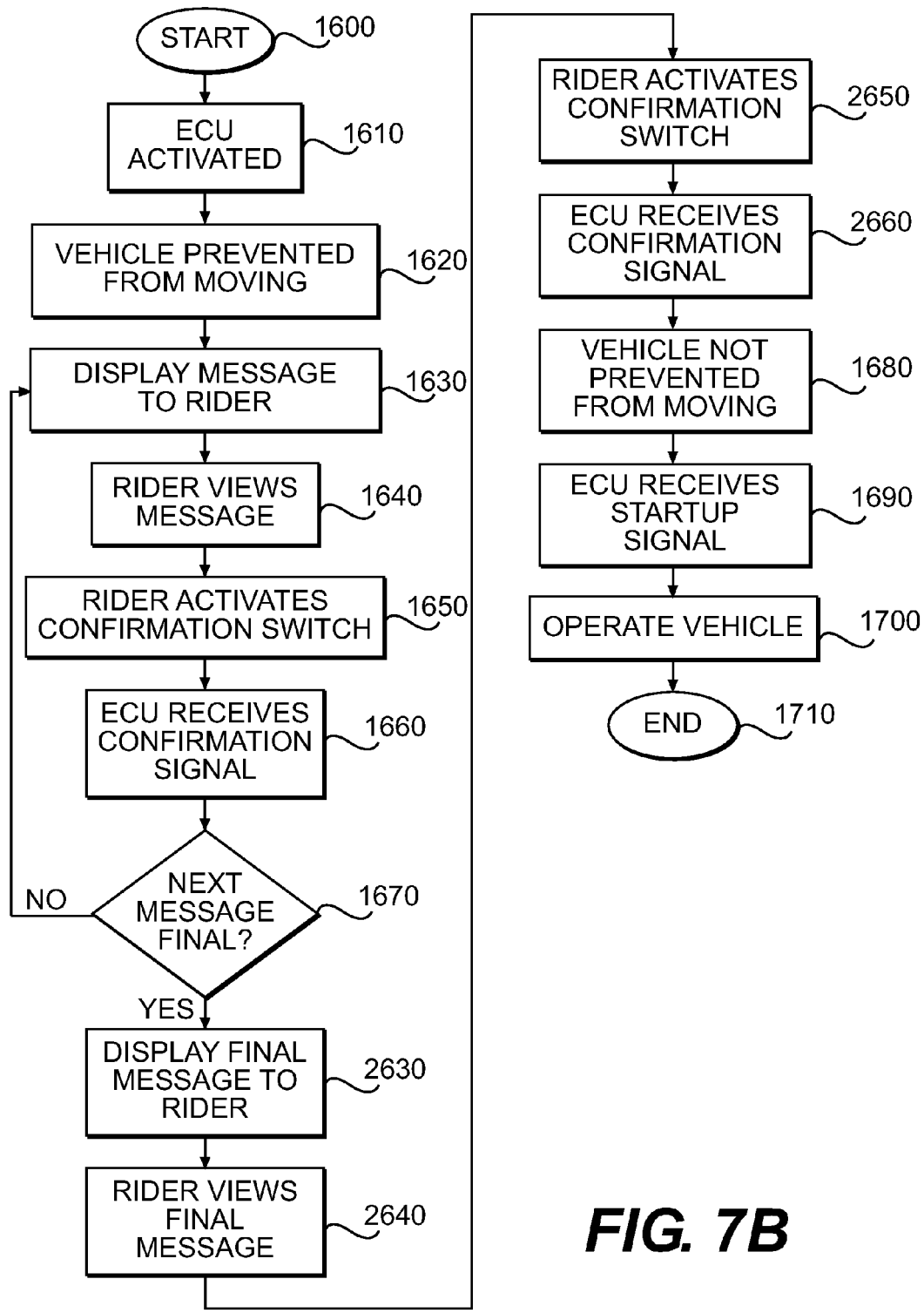
FIG. 7B is a logic diagram of the operation of a vehicle in accordance with a second embodiment of the present invention.

Referring now to FIG. 7B, an alternative operation of a vehicle incorporating the present invention, starting at step 1600, will be described in accordance with a second embodiment of the present invention.

In this embodiment, steps 1610 and 1620 correspond respectively to steps 610 and 620 as described in the embodiment of FIG. 7A, and as such these steps will not be described in further detail.

At steps 1630-1670 and 2630-2660, the information to be displayed to the rider is a sequence of two or more images, a sequence of two or more text messages, or a sequence including both images and text messages. For purposes of clarity, the present embodiment will be described for the exemplary case in which the information consists of two or more messages, but it should be understood that the present embodiment is of general application and does not depend on the nature of the information being displayed. For the purposes of the immediately following description, the two or more messages consist of one or more first messages and a final message.

At step 1630, the ECU sends a signal to the display cluster 410 to display to the rider the first message in the sequence of messages.

At step 1640, the rider views the first message displayed on the display cluster 410. If the first message is too large to be displayed in its entirety on the display cluster 410, a first portion of the message will initially be displayed, and the remainder of the message will be displayed as described in step 640 in the embodiment of FIG. 7A.

At step 1650, the rider activates the confirmation switch 520, causing a confirmation signal to be sent to the ECU 500. The confirmation signal indicates to the ECU 500 that the rider has viewed the first message displayed at step 1640.

At step 1660, the ECU 500 receives the confirmation signal.

At step 1670, in response to the confirmation signal being received at step 1660, the ECU 500 determines whether the next message to be displayed is the final message in the sequence of messages. If the next message is the final message, the ECU 500 proceeds to step 2630. If the next message to be displayed is not the final message in the sequence of messages, the ECU 500 returns to step 1630 and repeats steps 1630-1670 for the next message.

At step 2630, the ECU 500 sends a signal to the display cluster 410 to display to the rider the final message in the sequence of messages.

At step 2640, the rider views the final message displayed on the display cluster. If the final message is too large to be displayed in its entirety on the display cluster 410, a first portion of the message will initially be displayed, and the remainder of the message will be displayed as described in step 640 in the embodiment of FIG. 7A.

At step 2650, the rider activates the confirmation switch 520, causing a confirmation signal to be sent to the ECU 500. The confirmation signal indicates to the ECU 500 that the rider has viewed the final message displayed at step 2640.

At step 2660, the ECU 500 receives the confirmation signal.

At step 1680, in response to the confirmation signal being received at step 2660, the ECU 500 enters a second mode in which the vehicle is no longer prevented from moving. This step corresponds to step 670 described in the embodiment of FIG. 7A, and as such this step will not be described in further detail.

At step 1690, the ECU receives a startup signal from the startup system 516 as previously described, thus allowing the rider to operate the vehicle at step 1700.

The operation ends at step 1710.

Figure 7C:
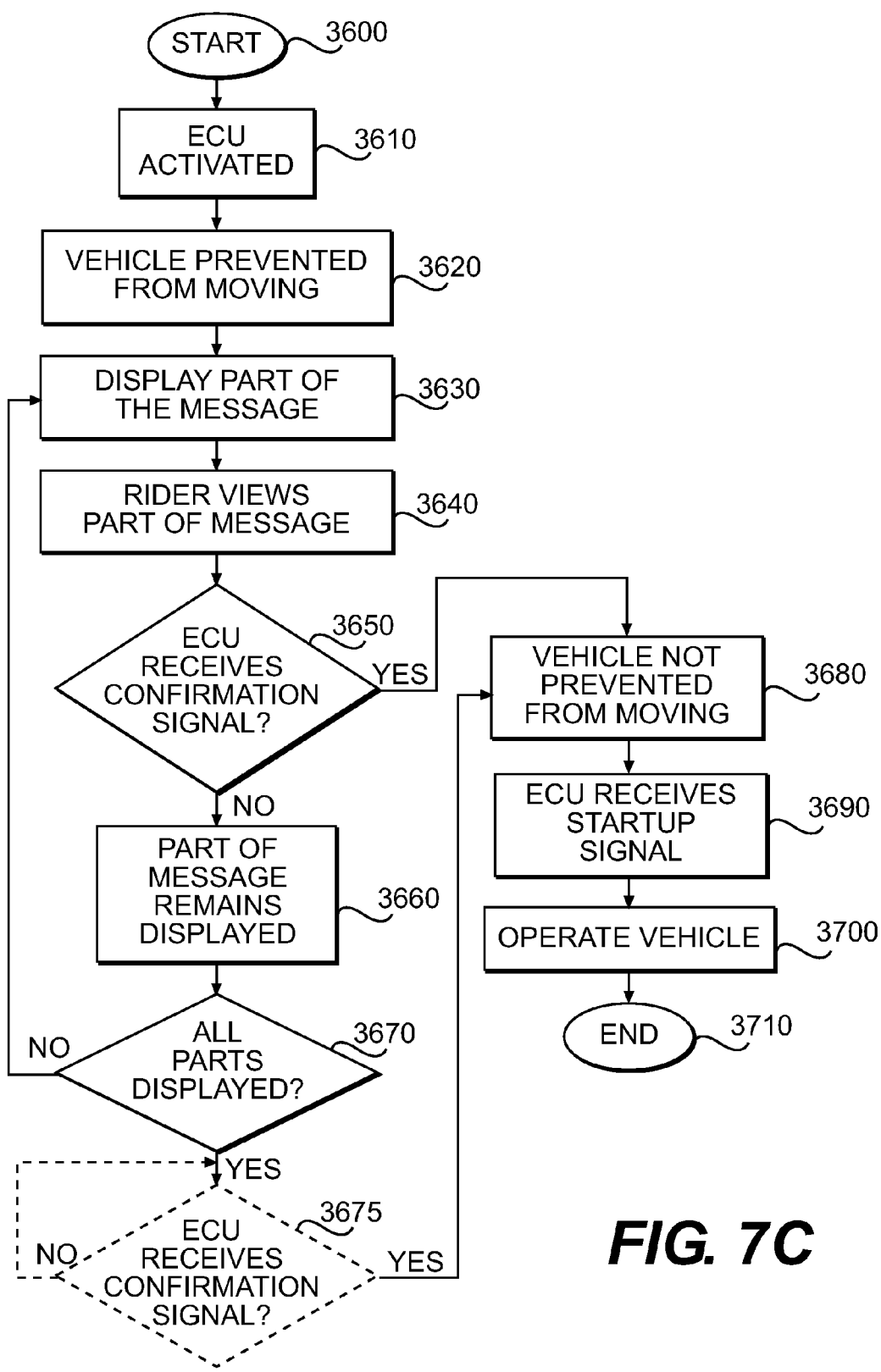
FIG. 7C is a logic diagram of the operation of a vehicle in accordance with a third embodiment of the present invention.

Referring now to FIG. 7C, an alternative operation of a vehicle incorporating the present invention, starting at step 3600, will be described in accordance with a third embodiment of the present invention.

In this embodiment, steps 3610 and 3620 correspond respectively to steps 610 and 620 as described in the embodiment of FIG. 7A, and as such these steps will not be described in further detail.

At steps 3630-3670, the information to be displayed to the rider is either a sequence of two or more images, a sequence of two or more text messages, a sequence including both images and text messages, or a single message that is too large to be displayed in its entirety on the display cluster 410. For purposes of clarity, the present embodiment will be described for the exemplary case in which the information consists of a single large message that must be displayed in two or more parts, but it should be understood that the present embodiment is of general application and does not depend on the nature of the information being displayed.

At step 3630, the ECU 500 sends a signal to the display cluster 410 to display a first part of the message.

At step 3640, the rider views the first part of the message displayed on the display cluster 410.

At step 3650, the rider may activate the confirmation switch 520, causing a confirmation signal to be sent to the ECU 500. Upon receiving the confirmation signal, the ECU 500 will not display the rest of the message, and will instead proceed directly to step 3680 and permit operation of the vehicle as will be discussed in greater detail below. This may be permitted by the ECU 500 under certain circumstances, for example, once the rider has viewed the information for the predetermined number of times, and has been permitted to operate the vehicle a predetermined number of times. He may then be sufficiently familiar with the operation of the vehicle that he no longer needs to view the information in order to operate the vehicle safely. It is contemplated that it may be possible to reset this feature, for example when the vehicle is lent or sold to another person who has not yet viewed the information. If the rider does not activate the confirmation switch 520, the ECU 500 proceeds to step 3660.

At step 3660, the ECU allows the first part of the message to remain displayed on the display cluster 410 for a predetermined period of time. The ECU then proceeds to step 3670.

At step 3670, the ECU 500 determines whether all of the parts of the message have been displayed. If all of the parts of the message have been displayed, the ECU 500 proceeds to step 3680. If all of the parts of the message have not yet been displayed, the ECU 500 returns to step 3630 and repeats steps 3630-3660 for the next part of the message.

It is contemplated that if all of the parts of the message have been displayed, the ECU 500 may alternatively proceed to step 3675, at which the ECU 500 does not proceed to step 3680 until the rider has activated the confirmation switch 520 and a confirmation signal is sent to the ECU 500. This alternative sequence is represented in dashed lines in FIG. 7C.

At step 3680, the ECU 500 enters a second mode in which the vehicle is no longer prevented from moving. This step corresponds to step 670 described in the embodiment of FIG. 7A, and as such this step will not be described in further detail.

At step 3690, the ECU receives a startup signal from the startup system 516 as previously described, thus allowing the rider to operate the vehicle at step 3700.

The operation ends at step 3710.

It is contemplated that the ECU 500 may keep track of how many times the sequence of steps in either FIG. 7A, 7B or 7C has been completed, and once any sequence has been completed a predetermined number of times, the ECU 500 will no longer enter the first mode when it is activated. Upon activation, the ECU 500 will then immediately enter the second mode at step 670, 1680 or 3680, and will no longer display the information to the rider or require confirmation before the rider is permitted to operate the vehicle. It is presumed that once the rider has viewed the information for the predetermined number of times, and has been permitted to operate the vehicle a predetermined number of times, he will be sufficiently familiar with the operation of the vehicle that he no longer needs to view the information in order to operate the vehicle safely. It is contemplated that it may be possible to reset this feature, for example when the vehicle is lent or sold to another person who has not yet viewed the information.

It is further contemplated that the ECU 500 may keep track of the time interval between successive activations of the ECU 500 at steps 610, 1610, 3610. If the time interval between successive activations is sufficiently short, for example less than a few minutes, the ECU 500 may be activated in the second mode described in steps 670, 1680, 3680, wherein the vehicle is not prevented from moving. In this manner, the rider would not have to view the display cluster 410 at steps 640, 1640, 2640, 3640 and activate the confirmation switch at steps 650, 1650, 2650, 3650 before restarting the vehicle. It is presumed that, having recently ceased operating the vehicle, the rider will still be sufficiently familiar with the operation of the vehicle that he does not need to view the information again in order to operate the vehicle safely. In addition, a short duration may be indicative of an event such as the engine stalling at a stop sign, in which case the rider would want to restart the engine and continue operating the vehicle quickly, conveniently and without interruption.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
a frame;
a vehicle body disposed on the frame;
a power pack supported at least in part by the frame for powering the vehicle, the power pack including an engine;
an electronic control unit (ECU) electrically connected to the power pack;
at least one seat supported by the frame for receiving a rider thereon;
a steering assembly disposed at least in part forwardly of the seat for steering the vehicle;
a startup switch electrically connected to the ECU, actuation of the startup switch causing a signal to be sent to the ECU indicative of a desired operation of the vehicle;
a display device disposed forwardly of the seat for displaying information to the rider, the display device being electrically connected to the ECU, the information being at least one of at least one previously stored text message and at least one previously stored graphical image, the information being displayed only after the ECU has been activated; and
a confirmation switch electrically connected to the ECU, actuation of the confirmation switch causing a confirmation signal to be sent to the ECU indicative of a display of information to a rider;
wherein upon activation of the ECU, the ECU prevents the vehicle from moving unless one of:
information is displayed by the display device and the confirmation signal is received by the ECU; and
the activation of the ECU is within a predetermined period of time after a previous activation of the ECU, the previous activation of the ECU having been followed by operation of the vehicle.

2. The vehicle as claimed in claim 1, wherein preventing the vehicle from moving comprises preventing engine startup.

3. The vehicle as claimed in claim 2, wherein the power pack comprises at least one fuel injector for supplying fuel to the engine, wherein preventing the vehicle from moving comprises preventing current flow to the at least one fuel injector.

4. The vehicle as claimed in claim 2, wherein the power pack comprises a starter electrically connected to the ECU, wherein preventing engine startup comprises preventing current flow to the starter.

5. The vehicle as claimed in claim 2, wherein the engine comprises at least one spark plug, the at least one spark plug being electrically connected to the ECU, wherein preventing engine startup comprises preventing current flow to the at least one spark plug.

6. The vehicle as claimed in claim 2, wherein the power pack further comprises a fuel pump electrically connected to the ECU for supplying fuel to the engine, wherein preventing engine startup comprises preventing current flow to the fuel pump.

7. The vehicle as claimed in claim 1, further comprising at least one propulsion device selectively operatively connected to the engine for moving the vehicle, and wherein preventing the vehicle from moving comprises operatively decoupling the engine from the propulsion device.

8. The vehicle as claimed in claim 1, further comprising:
a propulsion device operatively connected to the engine for moving the vehicle; and
a brake operatively connected to the propulsion device, wherein preventing the vehicle from moving comprises applying the brake to the propulsion device.

9. The vehicle as claimed in claim 1, wherein the startup switch and the confirmation switch are a single switch.

10. The vehicle as claimed in claim 1, wherein the confirmation switch is disposed on the steering assembly.

11. The vehicle as claimed in claim 1, wherein the vehicle is one of a three-wheeled motorized vehicle, an all-terrain vehicle, a snowmobile, and a personal watercraft.

12. The vehicle as claimed in claim 1, wherein the startup switch is part of one of a key-operated ignition system and a keyless ignition system.

13. The vehicle of claim 1, wherein the information includes an indication for the rider to consult information provided at a location other than the display.

14. A method of operating a vehicle, the vehicle comprising:
    a frame;
    at least one seat supported by the frame for receiving a rider thereon;
    a power pack supported by the frame for powering the vehicle, the power pack including an engine;
    an electronic control unit (ECU) electrically connected to the power pack; and
    a display device disposed forwardly of the seat for displaying information to the rider;
    the method comprising:
        activating the ECU;
        transmitting to the ECU a first signal indicative of a desired operation of the vehicle; and
        displaying information to the rider via the display device, the information being at least one of at least one previously stored text message and at least one previously stored graphical image, the information being displayed only after activation of the ECU;
        transmitting to the ECU a second signal confirming that the information has been displayed to the rider; and
        preventing the vehicle from moving unless one of:
            the ECU receiving the second signal; and
            the ECU being activated within a predetermined period of time after a previous activation of the ECU, the previous activation of the ECU having been followed by operation of the vehicle.

15. The method of claim 14, wherein transmitting to the ECU a signal indicative of a desired operation of the vehicle comprises actuating a startup switch.

16. The method of claim 14, wherein preventing the vehicle from moving comprises preventing engine startup.

17. The method of claim 15, wherein the information is at least one text message, and wherein the at least one text message is displayed by the display device in response to the actuation of the startup switch.

18. The method of claim 17, wherein the at least one message is a plurality of messages including at least one first message and a second message;
    wherein displaying information to the rider via the display device comprises:
        a) displaying the at least one first message to the rider via the display device;
        b) transmitting to the ECU a third signal confirming that the at least one first message has been displayed to the rider; and
        c) displaying the second message to the rider via the display device;
    and wherein transmitting to the ECU the second signal confirms that the second message has been displayed to the rider.

19. The method of claim 18, wherein the at least one first message is a plurality of first messages to be displayed in a sequence, the method further comprising:
    repeating a) and b) sequentially for each of the plurality of first messages, until all of the plurality of first messages have been displayed to the rider; and
    wherein the displaying of the second message to the rider occurs once all of the plurality of first messages have been displayed.

20. A method of operating a vehicle, the vehicle comprising:
    a frame;
    at least one seat supported by the frame for receiving a rider thereon;
    a power pack supported by the frame for powering the vehicle, the power pack including an engine;
    an electronic control unit (ECU) electrically connected to the power pack; and
    a display device disposed forwardly of the seat for displaying information to the rider, the information having a plurality of parts, the information being at least one of at least one previously stored text message and at least one previously stored graphical image;
    the method comprising:
        activating the ECU;
        transmitting to the ECU a first signal indicative of a desired operation of the vehicle;
        after the ECU is activated, sequentially displaying the parts of the information to the rider via the display device until at least one of:
            a) receipt by the ECU of a second signal initiated by the rider in response to at least one of the parts of the information being displayed; and
            b) the sequential display of all of the plurality of parts of the information to the rider; and
        preventing the vehicle from moving during the sequential displaying of the parts of the information unless the ECU is activated within a predetermined period of time after a previous activation of the ECU, the previous activation of the ECU having been followed by operation of the vehicle.

21. The method of claim 20,
    wherein sequentially displaying the parts of the information to the rider via the display device until at least one of:
        a) receipt by the ECU of a second signal initiated by the rider in response to the at least one part of the information being displayed; and
        b) the sequential display of all of the plurality of parts of the information to the rider comprises sequentially displaying the parts of the information to the rider via the display device until both:
            a) the receipt by the ECU of a second signal initiated by the rider in response to the at least one part of the information being displayed; and
            b) the sequential display of all of the plurality of parts of the information to the rider.

22. The vehicle of claim 13, wherein the location other than the display is on the vehicle.

23. The vehicle of claim 13, wherein the information to be consulted is an owner's manual.

* * * * *